United States Patent [19]

Lewis

[11] 3,988,887
[45] Nov. 2, 1976

[54] FUEL CONTROL SYSTEM FOR GAS TURBINE ENGINE

[75] Inventor: Geoffrey Arthur Lewis, Solihull, England

[73] Assignee: Lucas Industries Limited, Birmingham, England

[22] Filed: June 10, 1975

[21] Appl. No.: 585,683

[30] Foreign Application Priority Data
July 18, 1974 United Kingdom............... 31987/74

[52] U.S. Cl. ........................ 60/39.16 R; 60/39.28 R
[51] Int. Cl.² ...................... F02C 9/08; F02C 9/10
[58] Field of Search ......... 60/243, 39.28 R, 39.16 R

[56] References Cited
UNITED STATES PATENTS

| | | | |
|---|---|---|---|
| 3,475,910 | 11/1969 | Warne | 60/39.28 R |
| 3,514,948 | 6/1970 | Warne | 60/39.28 R |
| 3,540,217 | 11/1970 | Peczkowski et al. | 60/39.28 R |
| 3,557,552 | 1/1971 | Yates | 60/39.28 R |
| 3,777,483 | 12/1973 | Lewis | 60/243 |
| 3,808,801 | 5/1974 | Taylor | 60/39.28 R |
| 3,824,786 | 7/1974 | Skinner | 60/243 |

*Primary Examiner*—William L. Freeh
*Assistant Examiner*—Robert E. Garrett

[57] ABSTRACT

A fuel control system for a gas turbine engine which has a gas generator and a separate work turbine, comprises a metering device and an arrangement of throttle valves downstream of the metering device for controlling the fuel pressure drop through the metering device. A first throttle valve is responsive to a difference between desired and actual gas generator speeds to maintain the metering pressure drop constant for a selected speed. This throttle valve is also operable to restrict fuel flow if the work turbine exceeds a predetermined speed. A second throttle valve, in parallel with the first valve controls fuel flow at low engine speeds, and first valve controls fuel flow during acceleration.

10 Claims, 1 Drawing Figure

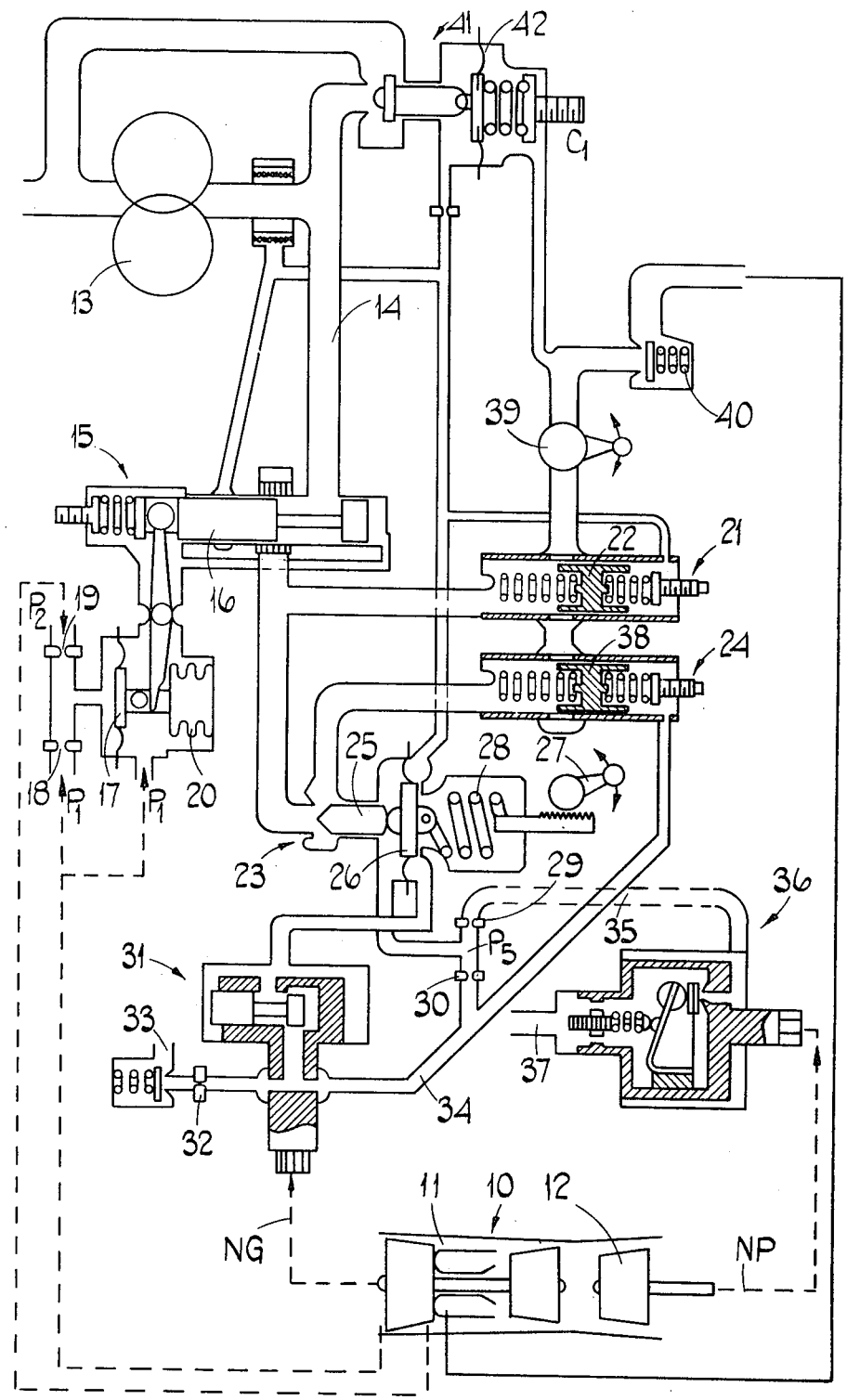

FUEL CONTROL SYSTEM FOR GAS TURBINE ENGINE

This invention relates to a fuel control system for a gas turbine engine which includes a gas generator turbine and a separate work turbine.

According to the invention a fuel control system for an engine of the foregoing kind comprises a variable metering device responsive to the pressure difference across the gas generator compressor, a first throttle valve downstream of said metering device and responsive to an increase in the pressure drop across said metering device to reduce fuel flow to the engine, a second throttle valve in parallel with said first throttle valve, said second throttle valve being responsive to an increase in desired engine speed, to an increase in the pressure downstream of said metering device and an increase in a servo pressure signal to increase fuel flow to the engine, a first governor valve responsive to the speed of the gas generator turbine to derive said servo pressure signal from the pressure upstream of said metering device, an increase in said turbine speed acting to reduce said servo pressure signal, and a spill valve responsive to an increase in the pressure drop between the upstream side of said metering device and the downstream side of said first throttle valve to spill fuel from the upstream side of said metering device.

In a preferred embodiment of the invention there is provided a second governor valve responsive to the speed of the work turbine to reduce said servo pressure signal when the work turbine speed exceeds a predetermined value.

In a further preferred embodiment of the invention there is provided a third throttle valve in series with said second throttle valve, said third throttle valve being responsive to an increase in the pressure downstream of said second throttle valve or to a decrease in said servo pressure signal to increase fuel flow to the engine.

An example of the invention will now be described with reference to the accompanying drawing which shows a gas turbine engine 10 having a gas generating portion 11 and a separate work turbine 12.

A positive displacement pump 13 is driven by the engine 10 and delivers fuel via a conduit 14 to a variable metering device 15. Device 15 has a control element 16 which is axially movable by a diaphragm assembly 17. Diaphragm assembly 17 is responsive to the pressure intermediate a pair of restrictors 18, 19, the flow area of restrictor 18 being three time that of restrictor 19. Pressures $P_1$ and $P_2$ derived from the inlet and outlet respectively of the gas generator compressor are applied to restrictors 18, 19 respectively. A bellows unit 20 is responsive to pressure $P_1$ and is coupled to the diaphragm assembly 17, such that an increase in pressure $P_1$ acting on bellows 20 urges control element 16 in a direction to increase flow through the metering device 15.

A first throttle valve 21, downstream of the metering device 15 has an axially slidable control member 22 which is movable against a spring, in a direction to increase fuel flow to the engine, by an increase in the pressure downstream of metering device 15, and is urged in the opposite direction by the pressure at the outlet of pump 13. Throttle valve 21 is thus responsive to the pressure drop across device 15, an increase in this pressure drop acting to reduce fuel flow to the engine.

Connected in parallel with throttle valve 21 is a series arrangement of second and third throttle valves 23, 24. Throttle valve 23 has a control member 25 which is urged towards an open position by the pressure downstream of device 15. Control member 25 is engaged by a diaphragm 26 which is responsive to the delivery pressure of pump 13 to urge control member 25 towards a shut position. Diaphragm 26 is movable against pump delivery pressure by a selector lever 27 whose position 0 is dependent on the desired engine speed. Lever 27 acts on diaphragm 26 via a spring 28. Diaphragm 26 is urged against the pump delivery pressure by a servo pressure signal $P_s$ which exists intermediate a pair of restrictors 29, 30 and which is derived in a manner to be described from the pressure downstream of pump 13.

A first speed-responsive governor valve 31 is driven by the turbine shaft of the gas generator portion 11 of engine 10. Valve 31 is in series with a restrictor 32 between the downstream side of pump 13 and a low pressure connection 33. Valve 31 is urged shut by an increase in the speed NG of the gas generator 11, whereby the pressure in a passage 34, intermediate valve 31 and restrictor 32, decreases as gas generator speed increases. Restrictors 30, 29 are in series between passage 34 and a further passage 35. A second speed-responsive governor valve 36 controls the flow between passage 35 and a low pressure connection 37. Valve 36 is driven by the power turbine 12 and is arranged to open when the speed NP of the turbine 12 rises above a predetermined value. Below this value valve 36 is shut and the pressure $P_s$ is equal to the pressure in passage 34.

The third throttle valve 24 has a control element 38 which is urged against a spring, in a direction to reduce fuel flow to the engine, by the pressure in passage 34, and is urged in the opposite direction by the pressure downstream of metering device 15. The downstream sides of throttle valves 21, 24 communicate via a shut-off cock 39 and a pressurising valve 40 with the burners of the engine 10. A spill valve 41 is controlled by a diaphragm 42 which is responsive to the total pressure drop across metering device 15, throttle valves 21, 23, 24 and shut-off cock 39. Spill valve 41 is responsive to an increase in this total pressure drop to spill fuel from the upstream sides to the downstream sides of pump 13.

In use, the metering device 15 has an effective flow area which is dependent on the pressure difference across the gas generator turbine. The provision that the effective area of restrictor 18 is three time that of restrictor 19 has the effect that at low flows through restrictors 18, 19, i.e. at engine light-up, the pressure intermediate restrictors 18, 19 is effectively equal to $P_1$.

With governor valve 36 shut, throttle valve 23 operates so as to tend to maintain the pressure drop across metering device 15 proportional to the difference between desired engine speed, as set by lever 27, and the speed of the gas generator turbine. Throttle valve 24 similarly tends to maintain the pressure drop across metering device 15 substantially constant for a given speed of the gas generator turbine. In steady-state conditions throttle valve 24 is wider open than throttle valve 23 and the pressure drop across metering device 15 is thus controlled by valve 23. If the speed NP of the power turbine 12 exceeds the level at which governor valve 36 opens, the resultant flow through restrictor 29 causes pressure $P_s$ to be set to a lower value, causing throttle valve 23 to reduce fuel flow to the engine. During acceleration valve 23 may become wider open than valve 24, in which case pressure drop through device 15 is controlled by valve 24, which acts as an acceleration control.

It is arranged that, during acceleration or in steady-state conditions, valve 21 has less flow therethrough than either valve 23 or valve 24. In these conditions therefore the pressure drop across device 15 is controlled by whichever of valves 23 or 24 have the smaller opening. During deceleration, however, valve 23 may become almost fully shut. Moreover, at very low engine speeds, for example at start-up, both valve 23 and valve 24 may be almost shut. In these circumstances pressure drop through device 15 is controlled by valve 21.

As indicated above valve 41 is responsive to the total pressure drop across metering device 15, throttle valves 21, 23, 24 and shut-off cock 39. Valve 41 is arranged so that this total pressure drop does not exceed a predetermined value, and therefore, effectively, that the pressure across pump 13 does not become excessive.

Valve 41 also sets an upper limit to the pressure drop across valve 15, whereby the flow through valve 15 cannot exceed a value which is dependent by this upper limit. A maximum fuel/air ratio for a given value of $P_2$ is thus determined by valve 41.

I claim:

1. A fuel control system for a gas turbine engine which includes a gas generator turbine and a separate work turbine, comprising a variable fuel metering device, means responsive to the pressure difference across the gas generator compressor for causing said metering device to vary the fuel flow therethrough, a first throttle valve having an inlet communicating with the outlet of said metering device and an outlet through which fuel can flow to the engine, said first throttle valve including means responsive to an increase in the pressure drop across said metering device for causing said first throttle valve to reduce fuel flow therethrough, a second throttle valve having an inlet and an outlet respectively communicating with the inlet and outlet of said first throttle valve, said second throttle valve including means responsive to an increase in desired engine speed, to an increase in the pressure downstream of said metering device and to an increase in a servo pressure signal for causing said second throttle valve to increase fuel flow therethrough, and a first governor means responsive to the speed of the gas generator turbine for deriving said servo pressure signal from the pressure upstream of said metering device, an increase in said turbine speed acting to reduce said servo pressure signal.

2. A system as claimed in claim 1 which includes a first flow restrictor in series with said first governor means between a location upstream of said metering device and a low pressure connection, said servo pressure signal being derived from a zone intermediate said first governor means and said first flow restrictor.

3. A system as claimed in claim 2 which includes a second governor valve, responsive to the speed of said work turbine, for reducing said servo pressure signal when the work turbine speed exceeds a predetermined value.

4. A system as claimed in claim 3 which includes second and third flow restrictors in series between said intermediate zone and said second governor means, said means for causing said second throttle valve to increase fuel flow therethrough being responsive to the pressure intermediate said second and third restrictors.

5. A system as claimed in claim 2 which includes a third throttle valve in series with said second throttle valve, said third throttle valve including means responsive to an increase in the pressure downstream of said second throttle valve, and to an increase in the speed of the gas generator turbine for increasing fuel flow through said third throttle valve.

6. A system as claimed in claim 5 in which said means for causing said third throttle valve to increase fuel flow therethrough is responsive to the pressure in said zone intermediate said first governor means and said first flow restrictor.

7. A system as claimed in claim 1 which includes fourth and fifth flow restrictors in series, for respective connection to the inlet and outlet of the gas generator compressor, and an actuator device, responsive to the pressure intermediate said fourth and fifth restrictors, for operating said variable metering device, said fourth restrictor having a larger flow area than said fifth restrictor.

8. A system as claimed in claim 7 in which the flow area of said fourth restrictor is at least three times that of said fifth restrictor.

9. A system as claimed in claim 10 which includes a shut-off valve between said first throttle valve and said spill valve.

10. A system as claimed in claim 1 which includes a spill valve having means responsive to an increase in the pressure drop between the upstream side of said metering device and the downstream side of said first throttle valve for spilling fuel from the upstream side of said metering device.

* * * * *